United States Patent Office 3,671,391
Patented June 20, 1972

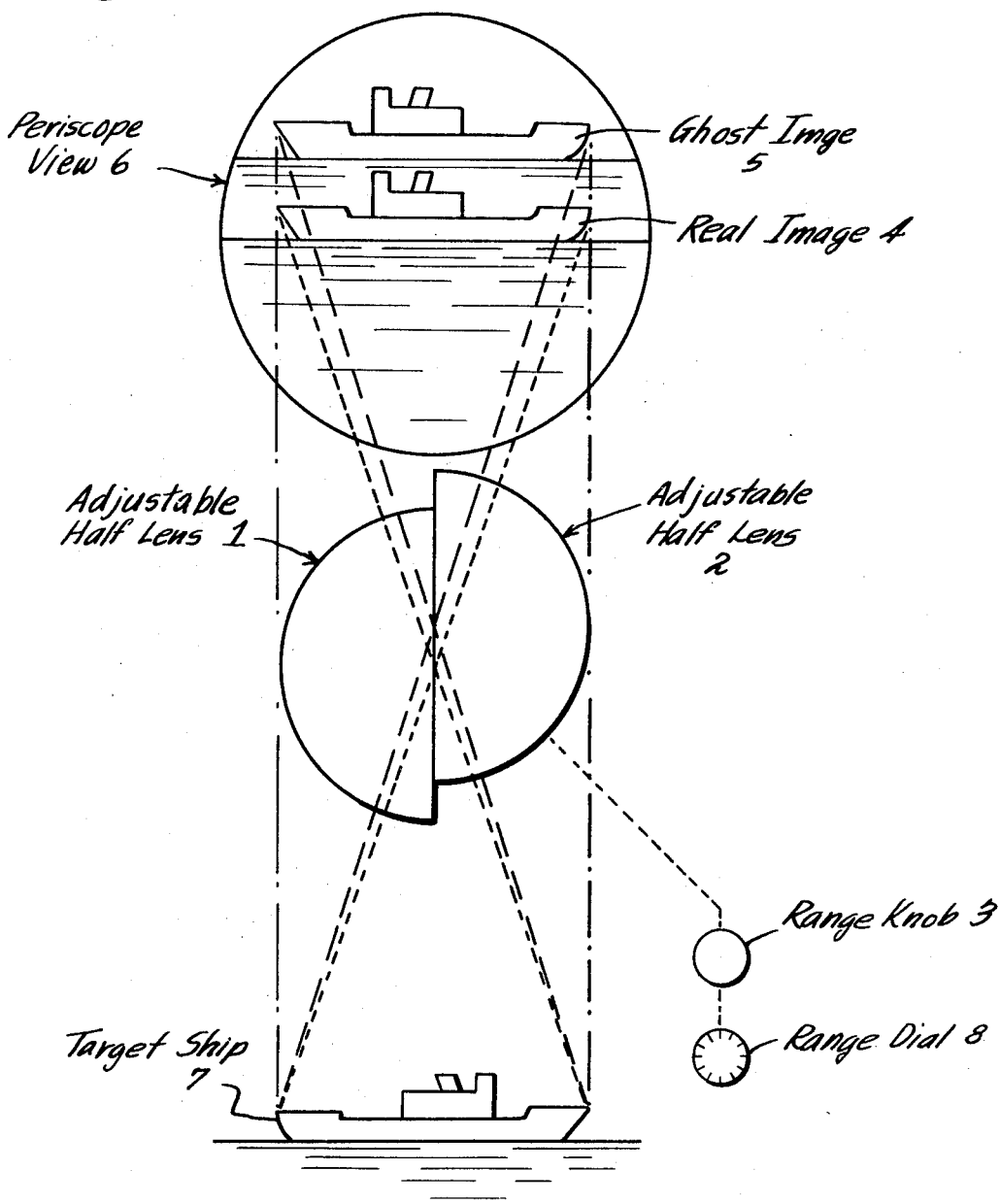

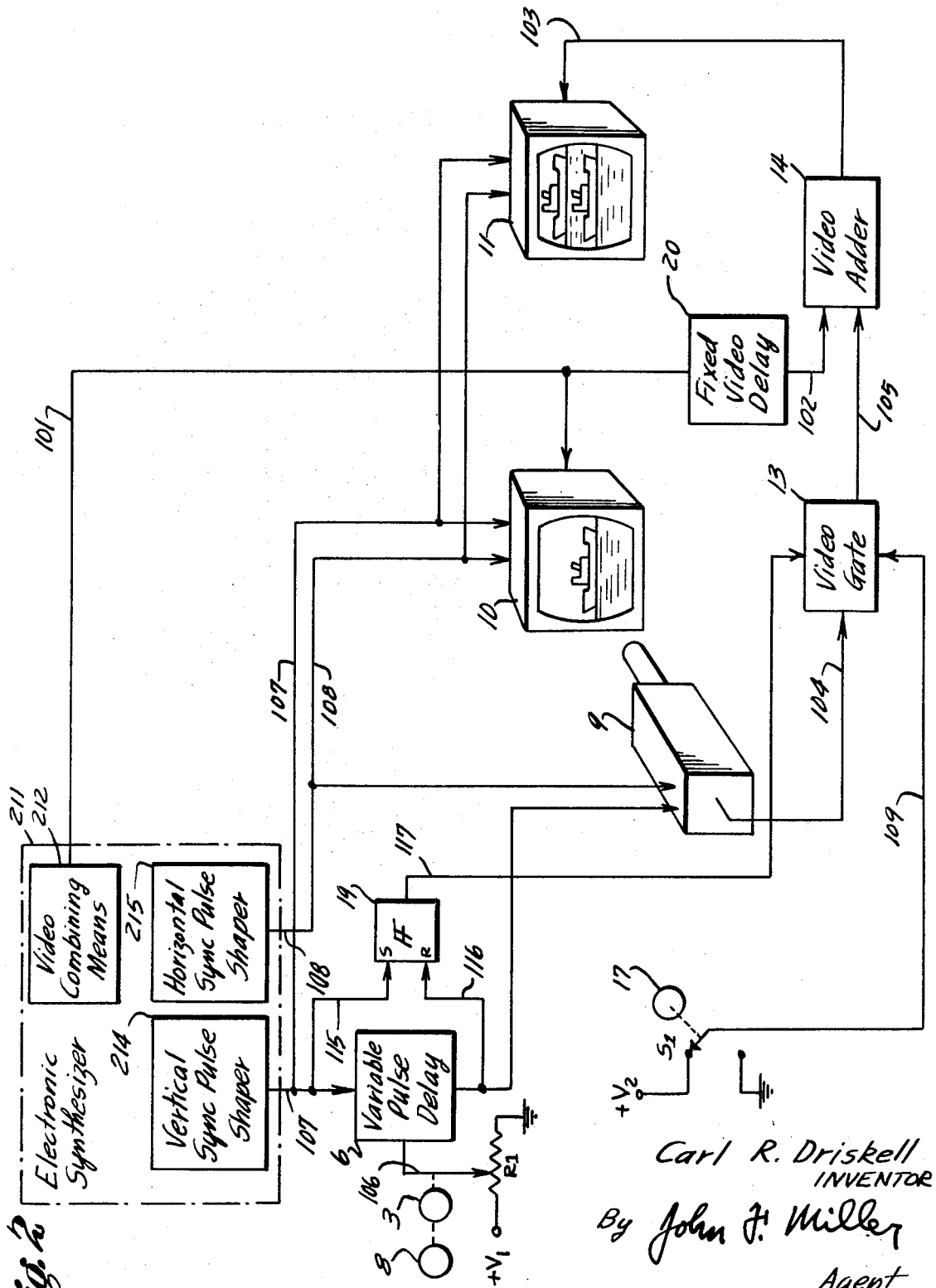

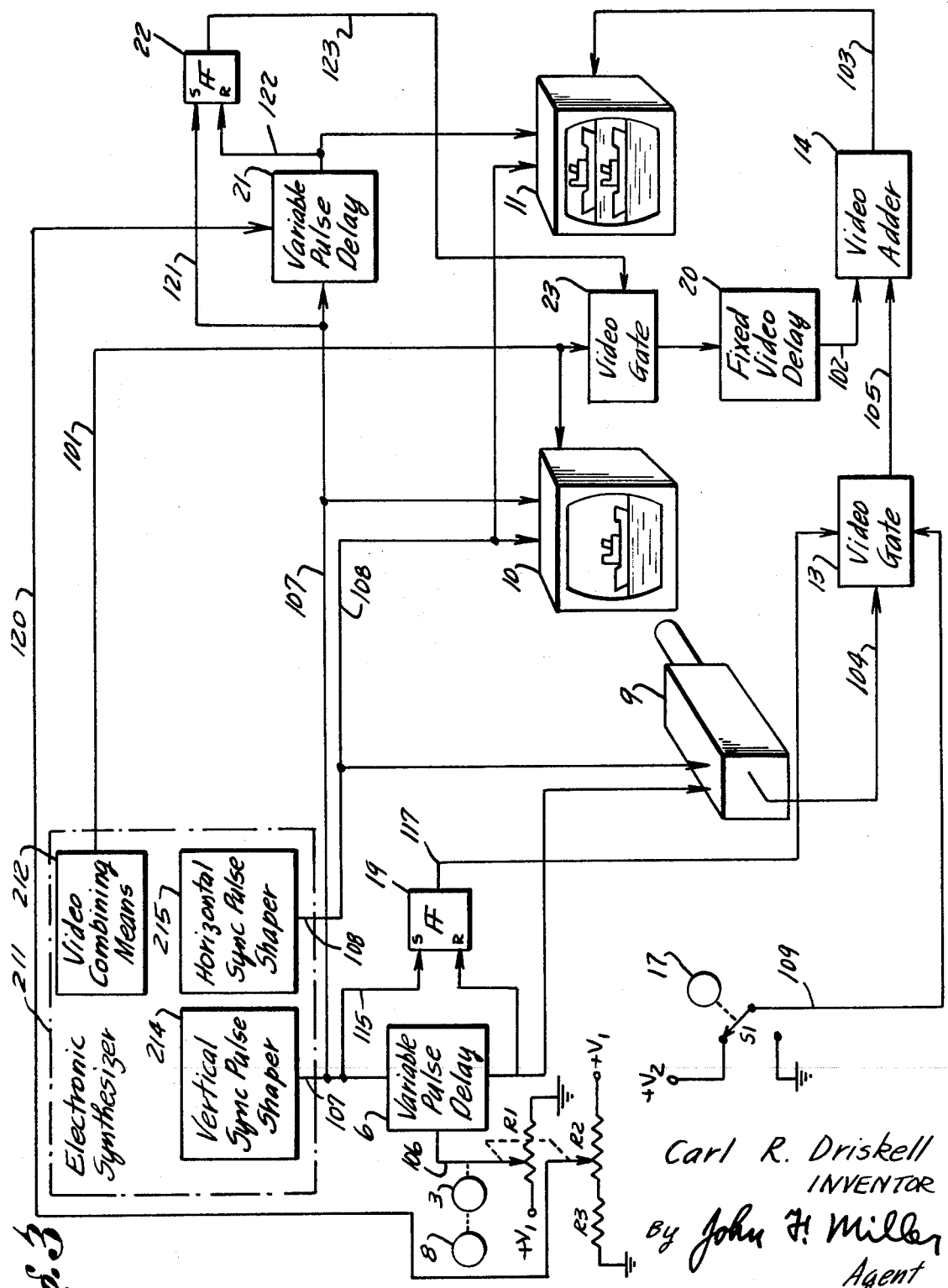

3,671,391
PERISCOPE STADIMETER SIMULATOR WITH
CAMERA SWEEP DELAY
Carl R. Driskell, Winter Park, Fla., assignor to the United
States of America as represented by the Secretary of
the Navy
Filed Dec. 7, 1970, Se. No. 95,595
Int. Cl. H04n 7/18; G09b 9/06
U.S. Cl. 178—6.8                                    5 Claims

ABSTRACT OF THE DISCLOSURE

In a training device having a periscope view simulator wherein a view seen through a periscope is synthesized and displayed on a monitor TV screen, means are provided for presenting a "ghost" image on the screen. The ghost image stimulates the image seen through a periscope when a stadimeter built into the periscope is used to determine the range of a ship or other possible torpedo target, with respect to the periscope.

STATEMENT OF GOVERNMENT INTEREST

The invention described herein may be manufactured and used by or for the Government of the United States of America for government purposes without the payment of any royalties thereon or therefor.

BACKGROUND OF THE INVENTION

The invention is in the field of simulator type training devices. In a periscope view simulator such as taught in U.S. Pat. 3,420,953 to Hanns S. Wolff and 3,497,614 to Edward A. Petrocelli et al., trainees are taught to operate a periscope by observing a scene projected on a television monitor screen. The trainee views the scene by looking through a periscope which is complete with periscope controls. Manipulation of the controls changes the view observable through the periscope in a realistic manner.

In such a trainer it is important that a periscope have all the accessories normally found on a submarine periscope in order to make the training as realistic as practicable.

One such accessory is an optical stadimeter which enables a submariner to determine the range of a distant object such as a surface ship (assuming the approximate height of the object is known). One such stadimeter is disclosed in U.S. patent application No. 24,750, now U.S. Pat. 3,621,128, filed by Carl R. Driskell. Therein are disclosed electronic means for simulating periscope stadimeter operation in a periscope view simulator training device. The present invention is an improved device for simulating periscope stadimeter operation, using combined electronic and optical means.

SUMMARY OF THE INVENTION

In a periscope view simulator training device an electronic synthesizer such as taught in the aforementioned patents to Hanns H. Wolff and Edward A. Petrocelli et al. furnishes a complex video signal to a television monitor. This video signal contains the information necessary to display a seascape complete with ships, submarines, etc. on the monitor screen which is viewed through a periscope.

The invention provides an additional television monitor, a television camera which surveys the additional monitor, and control and gating circuitry for adding delayed video information from the camera to the first monitor. Since both monitors receive the same video information from the synthesizer, operation of the control and gating circuitry makes it possible to superimpose a "ghost" image on the original image displayed on the first monitor to simulate periscope stadimeter operation.

BRIEF DESCRIPTION OF THE DRAWINGS

FIG. 1 shows the operating principles of an optical stadimeter such as may be built into a submarine periscope.
FIG. 2 is a block diagram of the invention.
FIG. 3 shows a second embodiment of the invention.

DESCRIPTION OF THE PREFERRED EMBODIMENTS

FIG. 1 illustrates the operating principles of an optical stadimeter such as may be built into a submarine periscope. A target ship 7 viewed through a periscope is projected by an adjustable half-lens 1 to appear as a real image 4 in a periscope view 6. An adjustable half-lens 2 and a half-lens 1 may be positioned by moving a range knob 3 mounted on the periscope tube to position a ghost image 5 and real image 4 so that the waterline of the ghost image is above and just touching the uppermost part of real image 4. Assuming that the approximate height of target ship 7 is known, the position of a range dial 8 which is moved with knob 3 will indicate the approximate range of target ship 7 from the periscope.

The invention, as shown in FIG. 2, provides a range knob 3 which is incorporated into the other controls mounted on the periscope tube (not shown) in a periscope view simulator. Range knob 3 is operatively connected to a range dial 8 so that adjustment of 3 adjusts 8. When the trainee observing a ship on the monitor screen through the periscope eyepiece adjusts range knob 3 to position the ghost image of a ship atop the real image in the manner explained in the description of FIG. 1, the range dial 8 will be positioned so that if the approximate height of the ship is known, the range can be real on dial 8.

The invention operates by selectively delaying the vertical sweep time of a camera 9 in one of two parallel channels between electronic synthesizer 211 and a television monitor 11 to create a movable ghost image on the screen of monitor 11. A first "real image" channel between synthesizer 211 and monitor 11 is comprised of a fixed video delay 20, a video adder 14 and connecting lines 101, 102 and 103. A second "ghost image" channel is comprised of a television monitor 10, a television camera 9, a video gate 13, a video adder 14, and connecting lines 101, 104, 105 and 103. Range knob 3 is operatively connected to the wiper of the potentiometer R1 which is supplied with voltage V1. Adjustment of knob 3 moves the wiper to adjust R1 so that a control voltage of a magnitude proportional to the range is supplied over a line 106 to variable pulse delay 6 to delay the vertical sweep signal of television camera 9. Electronic synthesizer 211 is comprised of complex circuits which include a plurality of TV cameras and video combining means 212 for combining the video outputs of the cameras into a composite video signal which is furnished to television monitors 10 and 11. The structure and function of these elements are described in the aforementioned patents to Hanns H. Wolff and Edward A. Petrocelli et al. Television monitor 11 projects the scene observed by the several cameras of the electronic synthesizer 211, including the seascape and ships which a trainee observes through the periscope of a periscope view simulator.

The composite video signal from a video combining means 212 in electronic synthesizer 211 is furnished to monitor 11 over the real image channel. The output signal of video adder 14 is the video information which is displayed by monitor 11. The composite video signal from video combining means 212 is also furnished to monitor 10. Camera 9 views the real image of monitor 10 and transmits the corresponding video signal over the remainder of the ghost image channel to monitor 11. The video output of camera 9 is furnished over line 104 to video gate 13, and if not blocked by gate 13, the signal is furnished to video adder 14 where it is added to the composite video signal received from fixed video delay 20. Video gate 13 is controlled to block or pass the signal from camera 9 in accordance with a control voltage on line 109 from switch S1 which is operatively connected to be controlled by an in/out knob 17 mounted near range knob 3 on the periscope tube (not shown) in the periscope view simulator.

The electronic synthesizer 211 includes a timing generator (not shown) which furnishes synchronizing pulses to vertical and horizontal sync pulse shapers 214 and 215. Sync pulse shapers 214 and 215 furnish synchronizing pulses to monitors 10 and 11 and camera 9 over connecting lines 107 and 108. The vertical sync pulse from 214 is fed through variable pulse delay 6 which controls the starting time of each vertical camera sweep.

The invention achieves the stadimeter effect in the scene observed through the periscope on monitor 11 by superimposing the image derived from the variably delayed signal on line 105 on the image derived from the signal on line 102. The effect of the invention can be understood by visualizing monitor 11 in operation projecting a composite scene derived from the video signal from fixed video delay 20 alone. Video gate 13 is "off" blocking the video signal from television camera 9 to video adder 14. Fixed delay 20 would have no noticeable effect on the picture shown on monitor 11. When a trainee positions himself at the eyepiece of the periscope and moves in/out knob 17 to the "in" position to simulate stadimeter operation, movement of knob 17 moves switch S1 from its grounded contact to its upper contact thereby supplying positive enabling voltage V2 to video gate 13. The video from camera 9 is then gated through 13 and furnished to video adder 14 over line 105. The video signal on line 105 is added in adder 14 to the video signal on line 102 to create a ghost image similar to that illustrated to FIG. 1 in the picture on monitor 11. The trainee adjusts the position of the ghost image vertically with respect to the real image on monitor 11 by adjusting range knob 3 to vary the setting of potentiometer R1, thereby varying the delay of the vertical sweep of camera 9 which delays proportionally the video signal transmitted by camera 9. This procedure simulates the adjustment of a ghost image illustrated in FIG. 1 accurately and realistically. Variable pulse delay 6 is initially set for one frame delay such that the ghost image is vertically aligned with the real image; horizontal image alignment is set by fixed video delay 20. In operation, an adjustment of delay 6 to decrease the delay of the vertical camera sweep causes vertical movement of the ghost image.

The blanking pulses must be removed from the composite video signal, since a delay in the video signal will shift the blanking pulses into the display time. Provisions must also be provided to inhibit that portion of the image shifted off the top of the screen such that it does not reappear at the bottom of the screen in the adjacent time frame. Flip flop 19 provides both of these functions. The vertical synchronizing pulses of vertical sync pulse shaper 214 are supplied over line 115 to the set side of flip flop 19. The delayed vertical synchronizing pulses are supplied over line 116 to the reset side of flip flop 19. Flip flop 19 supplies a positive enabling voltage over line 117 to gate 13 each time it is set by a sync pulse from line 115. Unless inhibited by line 109, gate 13 remains enabled until a fraction of a field time later when the delayed sync pulse from line 116 resets flip flop 19 which then applies a disabling ground to video gate 13. The cycle begins again at the occurrence of the next set pulse furnished to flip flop 19. As the vertical sync is delayed less and less to shift the image upward on the screen of monitor 11, video gate 13 inhibits proportionately more of the ghost video signal that would otherwise appear at the bottom of the screen.

In the operational periscope, the real image and the ghost image move in opposite directions with adjustment of range knob 3 during stadimeter operation. To more exactly simulate this stadimeter operation, the television system of FIG. 2 may be modified to shift the real image downward at the same time and by the same amount that the ghost image is shifted upward. An embodiment functioning in this manner is shown in FIG. 3. To accomplish simultaneous equal and opposite movement of the real and ghost images, a variable pulse delay 21, a flip flop 22, a video gate 23, a potentiometer R2, a resistor R3 and interconnecting cables 120, 121, 122 and 123 are added to the system of FIG. 2.

The embodiment of FIG. 3 operates by increasing the delay of the vertical sweep time of televsion monitor 11 by an amount equal to one-half the delay time of camera 9. Variable pulse delay 21 delays the vertical sweep of television monitor 11 by one field when the ghost image is made to coincide with the real image. The composite scene displayed on monitor 11 is shifted downward a distance proportional to the analog control voltage fed from potentiometer R2 over a line 120 to pulse delay 21. The wiper arm of potentiometer R2 is mechanically connected to the wiper arm of potentiometer R1. Potentiometer R2 is electrically connected in series with resistor R3, having equal resistance value, in such a way that the voltage variation at the wriper arm of potentiometer R2 is equal in magnitude to one-half the voltage variation on the wiper arm of potentiometer R1 but opposite in direction. For example, a fifty percent increase in voltage at the wiper arm of R1 corresponds to a twenty-five percent decrease in voltage at the wiper arm of R2. In the above example, the ghost image on monitor 11 would be shifted upward by fifty percent of the raster height but the composite display on monitor 11 would be shifted downwardly by twenty-five percent of the raster height for a net twenty-five percent vertical shift in the ghost and real images. This procedure simulates the adjustment of the ghost and real images illustrated in FIG. 1 accurately and realistically. Variable pulse delays 6 and 21 are initially set for one frame delay such that the ghost image is vertically aligned with the real image. In operation, and adjustment of delay 6 to decrease the delay of the vertical sweep of camera 9 causes an upward shift of the ghost image. The simultaneous adjustment of delay 21 to increase the delay of vertical sweep of monitor 11 causes a downward shift of the real image.

Flip flop 22 and video gate 23 operate in a manner identical to that described for flip flop 19 and video gate 13. As the composite image on monitor 11 is shifted upward by pulse delay 21, video gate 23 is made to inhibit that portion of the image shifted off the top of the screen that would otherwise appear at the bottom of the screen.

What is claimed is:
1. In a periscope view simulator training device having a first television monitor for receiving a first video signal from an electronic synthesizer and displaying a scene observable through a periscope, the improvement comprising:
   a second television monitor for receiving said first video signal and displaying a scene,
   a television camera positioned to observe the scene displayed on said second monitor and for generating a second video signal,
   a video adder for adding said first and second video signals,
   connecting means connecting the output of said adder to said first monitor to furnish the sum of said first and second video signals to said first monitor and to superimpose a scene displayed on said second monitor on a scene displayed on said first monitor,
   a video gate for gating said second video signal from said camera to said adder,
   control means for controlling said gate,
   said control means being connected to said gate to disable said gate at such times as required to block parts of said second video signal to prevent parts of the scene displayed on said second monitor from being displayed on said first monitor, means for applying a horizontal sync voltage and a vertical sync voltage to said camera and to said monitors, and adjustable delay means for delaying said vertical sync voltage to said camera to delay the second video signal generated by said camera to move the scene developed from said second video signal on said first monitor.

2. The apparatus of claim 1, said control means including:

a flip flop connected to furnish an enabling signal to said video gate when set, and means to set said flip flop with a vertical sync pulse, and to reset said flip flop with a delayed vertical sync pulse from said adjustable delay means, the delay of said delay means being proportional to the movement of the scene on said first monitor derived from said second video signal.

3. The apparatus of claim 2 and including:

a range knob for adjusting said variable delay means, and a range dial connected to said range knob to indicate the position of the scene derived from said second video signal on said first monitor.

4. The apparatus of claim 3 and including:

a fixed video delay and a second video gate connected in tandem between said electronic synthesizer and said video adder to delay and to selectively gate said first video signal to said video adder, a second variable delay connected between said electronic synthesizer and said first monitor to variably delay vertical sync pulses from said electronic synthesizer, a second flip flop connected to be set by a vertical sync pulse and to be reset by a vertical sync pulse delayed by said second variable pulse delay, said second flip flop being connected to furnish an enabling signal to said second video gate when set.

5. The apparatus of claim 4 and including:

a first potentiometer operatively connected to said range knob, a second potentiometer operatively connected to said range knob, said first potentiometer being connected to furnish a variable voltage to vary said first variable delay means in proportion to the adjustment of said range knob and said range dial, said second potentiometer being connected to furnish a variable voltage to vary said second variable delay means in proportion to adjustment of said range knob and said range dial, the arrangement being such that adjustment of said range knob results in equal and opposite movement of the image on said first monitor derived from said first video signal and the image on said first monior derived from said second video signal.

References Cited
UNITED STATES PATENTS

| 3,153,699 | 10/1964 | Plass | 178—6.8 |
| 2,307,661 | 1/1943 | Batchelor | 178—DIG 6 |
| 3,030,443 | 4/1962 | Groll | 178—6.8 |
| 2,851,519 | 9/1958 | Schira | 178—6.8 |

ROBERT L. GRIFFIN, Primary Examiner

J. A. ORSINO, Jr., Assistant Examiner

U.S. Cl. X.R.

35—120, 25; 178—DIG 35